(12) United States Patent
Jalaldeen et al.

(10) Patent No.: US 10,579,340 B2
(45) Date of Patent: Mar. 3, 2020

(54) MODEL ELEMENT CHARACTERISTIC PRESERVATION IN MODELING ENVIRONMENTS

(75) Inventors: Ahamed Jalaldeen, Bangalore (IN); Ashish Mungi, Bangalore (IN); Cedric Sequeira, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1122 days.

(21) Appl. No.: 13/489,879

(22) Filed: Jun. 6, 2012

(65) Prior Publication Data

US 2013/0332123 A1 Dec. 12, 2013

(51) Int. Cl.
*G06F 8/10* (2018.01)

(52) U.S. Cl.
CPC ..................... *G06F 8/10* (2013.01)

(58) Field of Classification Search
None
See application file for complete search history.

(56) References Cited

U.S. PATENT DOCUMENTS

| | | | |
|---|---|---|---|
| 7,979,840 B2 | 7/2011 | Zhang et al. | |
| 2002/0104068 A1* | 8/2002 | Barrett et al. | 717/104 |
| 2003/0101255 A1* | 5/2003 | Green | 709/223 |
| 2007/0168921 A1* | 7/2007 | Bailleul et al. | 717/104 |
| 2008/0127047 A1* | 5/2008 | Zhang | G06Q 10/06 717/104 |
| 2008/0294408 A1 | 11/2008 | Padmanabhan | |
| 2009/0132211 A1 | 5/2009 | Lane et al. | |
| 2010/0153464 A1* | 6/2010 | Jalaldeen | 707/802 |
| 2010/0153907 A1 | 6/2010 | Hanner et al. | |
| 2011/0004499 A1* | 1/2011 | Zhang et al. | 705/7 |
| 2011/0202499 A1 | 8/2011 | Spiers | |

OTHER PUBLICATIONS

D'Souza et al., First-Class Extensibility for UML-Packaging of Profiles, Stereotypes, Patterns, Aug. 1999, Springer, pp. 1-14.*

(Continued)

*Primary Examiner* — Omar F Fernandez Rivas
*Assistant Examiner* — Bernard E Cothran
(74) *Attorney, Agent, or Firm* — Michael O'Keefe; Matthew M. Hulihan; Heslin Rothenberg Farley & Mesiti PC

(57) ABSTRACT

Model element characteristic preservation is provided when instantiating unified modeling language elements of a unified modeling language model. Requirements management tool elements become associated with a stereotype via, for instance, user assignment of the stereotype to a requirements type of the requirements management project. A stereotype assignment is obtained for a requirements management tool element, and the stereotype is automatically applied when instantiating a UML element representative of the requirements management tool element. Nesting and traceability relationships between the requirements management tool element and other requirements management tool elements are additionally preserved.

20 Claims, 10 Drawing Sheets

(56) References Cited

OTHER PUBLICATIONS

Misic, Authoring UML profiles: Part 1. Create and deploy UML profiles using Rational Software Architect, Rational Systems Developer, and Rational Software Modeler to, Apr. 29, 2008, IBM, pp. 1-27.*
Techopedia, Instantiate, 2016, Techopedia, pp. 1-3.*
Franchitti, Software Engineering G22.2440-001 Ratioinal Tools Overview, Jan. 2005, New York University, pp. 1-33 (Year: 2005).*
Arpinen et al., Meta-Model and UML Profile for Requirements Management of Software and Embedded Systems, 2011, Hindawi Publishing Corporation, vol. 2011, pp. 1-14 (Year: 2011).*
Merriam-Webster, Definition of Method, 2018, Merriam-Webster, pp. 1-2 (Year: 2018).*
Dictionary.com, host definition, 2018, Dictionary.com, pp. 1-7 (Year: 2018).*
Zielczynski, Requirements Management Using IBM Rational RequisitePro, 2007, IBM, pp. 1-333 (Year: 2007).*
Hovater, UML-requirements traceability using IBM Rational RequisitePro, IBM Rational Software Architect, and BIRT, Part 1: Reporting requirements, 2008, IBM, pp. 1-56 (Year: 2008).*
RaQuest, Requirements Management Tool RaQuest, 2008, RaQuest, pp. 1-3 (Year: 2008).*
Arpinen et al., Meta-Model and UML Profile for Requirements Management of Software and Embedded Systems, 2011, Hindawi Publishing Corporation, pp. 1-14 (Year: 2011).*
Ian Spence et al. "Traceability Strategies for Managing Requirements with Use Cases", Rational Software White Paper TP166 (2000), http://www.wthreex.com/rup/papers/pdf/traceabilityStrategies.pdf.
Visual Studios, "Standard Sterotypes for UML Models", (2010), http://msdn.microsoft.com/en-us/library/dd465146.aspx.
Yufei et al. "Research on Requirement Management for Complex Systems", (2010), http://ieeexplore.ieee.org/xpl/freeabs all.jsp?arnumber=5486270.
Steven Hovater, developerworks, UML-requirements traceability using iBM Rational REquisitePro, IBM Rational Software Architect, and BIRT, Part 1: Reporting requirements. (2008), http://www.ibm.com/developerworks/rational/tutorials/dw-r-umltracebirt/dw-r-umltracebirt-pdf.pdf.
Egyed et al, Automating Requirements Traceability: Beyond the Record & Replay Paradigm, 2002, http://citeseer.ist.psu.edu/viewdoc/summary?doi=10.1.1.13.6352.

* cited by examiner

| REQUIREMENT TYPE | META-CLASS | STEREOTYPE |
|---|---|---|
| GOAL: BUSINESS GOAL | CLASS | BusinessModeling::BusinessGoal |
| KPI:KEY PERFORMANCE INDICATOR | CONSTRAINT | BusinessArchitecture::KPI |

MODEL ELEMENT CHARACTERISTIC PRESERVATION IN MODELING ENVIRONMENTS

BACKGROUND

Modeling tools provide a means by which various concepts including business goals, key performance indicators, business rules, and services can be represented. A modeling tool facilitates specification of concept characteristics as well as the relationships between those concepts. Many modeling tools are based on the Unified Modeling Language (UML). The UML includes a set of standard modeling concepts like class, interface, package, and component, which are included as part of a standard metamodel, also known as the "UML metamodel".

The UML metamodel can be extended to additional concepts using a UML profile. A UML profile allows extension of the standard UML metamodel for a particularized purpose, such as for a particular technology, like a service-oriented architecture, or a particular industry, as examples. An individual extension to the standard UML metamodel is known as a stereotype, and one or more stereotypes defining one or more extensions to the UML metamodel are included in the UML profile. As examples, a stereotype "Business Goal" extends UML's 'class', and a stereotype "Service" extends UML's 'interface'.

Stereotype extensions to the UML metamodel are important when modeling elements created in specialized modeling tools, such as elements created in a requirements management tool for service modeling. A requirements management tool enables specification of requirements for model concepts (such as Business Goals, and Key Performance Indicators), as well as recognition and representation of nesting and traceability relationships between the elements representing these concepts in the requirements management tool. When modeling elements from a specialized modeling tool, such as requirement elements of a requirements management tool, in a different modeling environment, such as a UML-based modeling environment, the standard UML metamodel may not contain the proper facilities for modeling these requirements management tool elements, which are likely particularized to a specific industry or purpose. Stereotypes, therefore, enable the extension of the UML metamodel to accommodate concepts from the requirements management tool. As an example, stereotypes may be specified for business goals, key performance indicators, and business rules (concepts in a requirements management tool), so that these concepts can be modeled in the UML-based modeling tool.

BRIEF SUMMARY

A challenge exists when modeling requirements management tool elements in a UML-based modeler. The requirements management tool element will be modeled in the UML-based modeler by instantiating an element in the UML-based modeler, but the model element characteristics, such as nesting and traceability relationships between the requirements management tool element and other requirements management tool elements, are not carried forward to the instantiated element of the UML-based modeler. Furthermore, the UML-based modeler is unaware of the proper stereotype for the requirements management tool element, so the instantiated element in the UML-based modeler is instantiated without an associated stereotype. Consequently, a user is required both to recreate the nested structure and traceability relationships between the instantiated elements in the UML-based modeler, and to associate the proper stereotypes to the elements in the UML-based modeler. This breeds inefficiency (involves significant effort, drop in productivity) and can lead to quality issues, for instance inconsistent stereotype usage and loss of traceability between elements. What is needed is a facility that leverages model element characteristics, including stereotype designations, nesting and traceability relationships, from a requirements management tool, and preserves these characteristics in building UML representations of requirements management tool elements in the UML modeling tool.

The shortcomings of the prior art are overcome and additional advantages are provided through the provision of a method that includes obtaining, by a processor, an indication of a requirement type of a requirements management tool element, obtaining an indication of a stereotype associated with the indicated requirement type of the requirements management tool element, the stereotype defining an extension to a metamodel of a unified modeling language, and instantiating an element of the unified modeling language in a unified modeling language modeling tool for modeling the requirements management tool element, wherein the instantiating comprises automatically applying the determined stereotype to the unified modeling language element based on the obtained indication of the stereotype associated with the indicated requirement type of the requirements management tool element.

Additionally, a system is provided which includes a memory and a processor in communication with the memory. The system is configured to perform a method which includes obtaining an indication of a requirement type of a requirements management tool element, obtaining an indication of a stereotype associated with the indicated requirement type of the requirements management tool element, the stereotype defining an extension to a metamodel of a unified modeling language, and instantiating an element of the unified modeling language in a unified modeling language modeling tool for modeling the requirements management tool element, wherein the instantiating comprises automatically applying the determined stereotype to the unified modeling language element based on the obtained indication of the stereotype associated with the indicated requirement type of the requirements management tool element.

Further, a computer program product is provided that includes a computer readable storage medium readable by a processor and storing instructions for execution by the processor to perform a method which includes obtaining, by a processor, an indication of a requirement type of a requirements management tool element, obtaining an indication of a stereotype associated with the indicated requirement type of the requirements management tool element, the stereotype defining an extension to a metamodel of a unified modeling language, and instantiating an element of the unified modeling language in a unified modeling language modeling tool for modeling the requirements management tool element, wherein the instantiating comprises automatically applying the determined stereotype to the unified modeling language element based on the obtained indication of the stereotype associated with the indicated requirement type of the requirements management tool element.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention advantageously enable model element characteristic preservation is modeling environments. More specifically, aspects of the present invention leverage stereotype association, and nesting and traceability relationships from a requirements management tool in building a UML model of a requirements management tool project. Each requirement type of the requirements management tool is associated with a stereotype, i.e. an extension to the UML metamodel. A model element of the requirements management tool is of a particular requirement type and becomes stereotyped by way of the stereotype association made to that particular requirement type. In building the UML model of the requirements management tool project, elements of the requirements management tool are retrieved, as is the nested structure and traceability information associated with those elements. A UML model is built that includes instantiated UML representations of requirements management tool elements, wherein the UML representations of the UML model are instantiated with the associated stereotype and wherein nested structure and traceability relationships are preserved.

Figure 1:
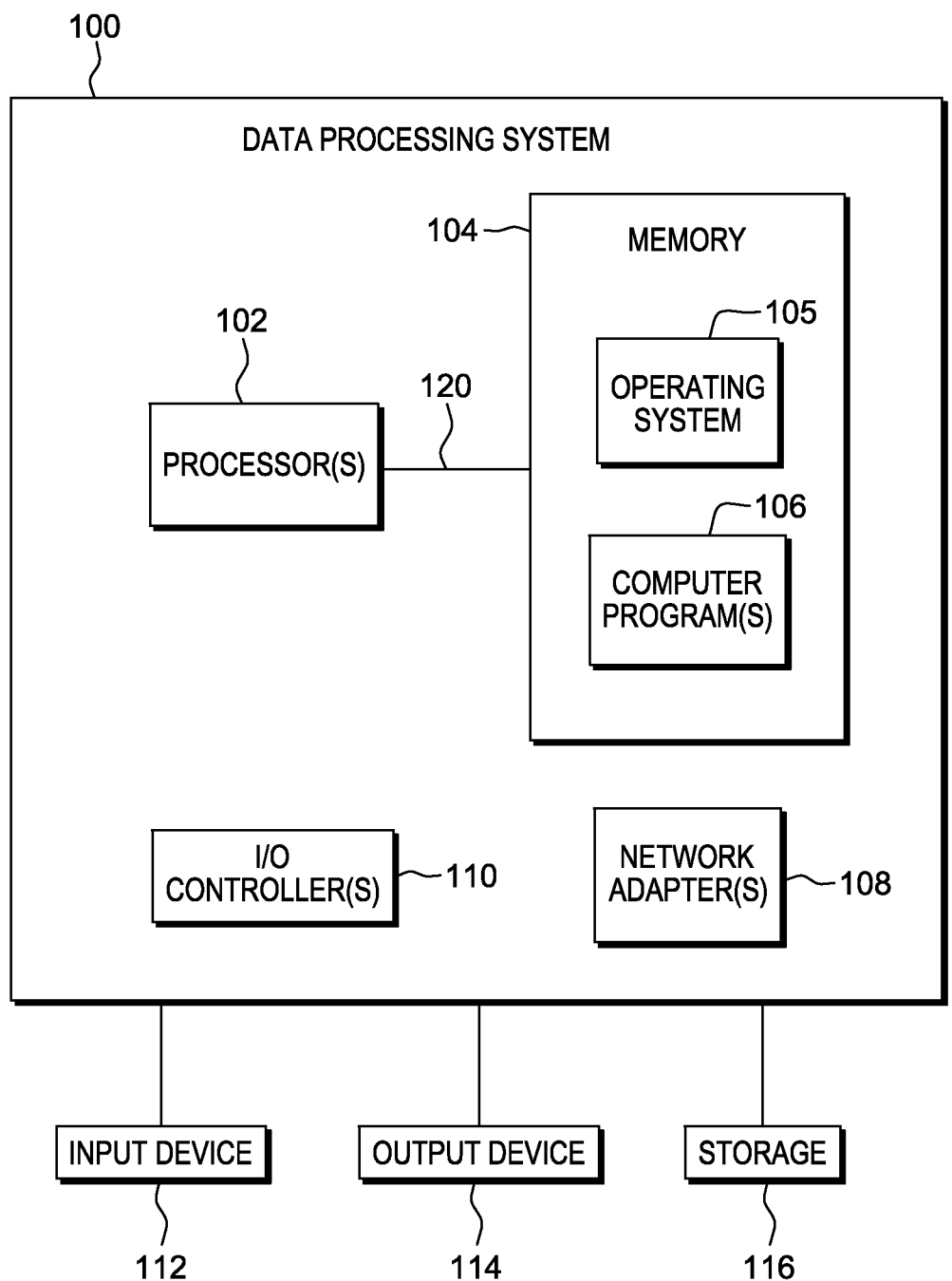
FIG. 1 depicts one example of a data processing system to incorporate and use one or more aspects of the present invention.

FIG. 1 depicts one example of a data processing system to incorporate and use one or more aspects of the present invention. Data processing system 100 may be based on, for instance, the xSeries® or pSeries® architectures offered by International Business Machines Corporation, Armonk, N.Y. (xSeries® and pSeries® are registered trademarks of International Business Machines Corporation, Armonk, N.Y.), or on Intel Corporation's x86 architecture.

Data processing system 100 is suitable for storing and/or executing program code and includes at least one processor 102 coupled directly or indirectly to memory 104 through, e.g., a system bus 120. In operation, processor(s) 102 obtain from memory 104 one or more instructions for execution by the processors. Memory 104 may include local memory employed during actual execution of the program code, bulk storage, and cache memories which provide temporary storage of at least some program code in order to reduce the number of times code must be retrieved from bulk storage during program code execution. A non-limiting list of examples of memory 104 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 104 includes an operating system 105 and one or more computer programs 106, such as one or more modeling tools. Example modeling tools include the Rational® Requisite Pro®, Rational® Software Architect, or Rational® Software Modeler products offered by International Business Machines Corporation (Rational® and Requisite Pro® are registered trademarks of International Business Machines Corporation, Armonk, N.Y.).

Input/Output (I/O) devices 112, 114 (including but not limited to keyboards, displays, pointing devices, etc.) may be coupled to the system either directly or through I/O controllers 110.

Network adapters 108 may also be coupled to the system to enable the data processing system to become coupled to other data processing systems or remote printers or storage devices through intervening private or public networks. Modems, cable modem and Ethernet cards are just a few of the currently available types of network adapters 108.

Data processing system 100 may be coupled to storage 116 (e.g., a non-volatile storage area, such as magnetic disk drives, optical disk drives, a tape drive, etc.), having one or more databases. Storage 116 may include an internal storage device or an attached or network accessible storage. Computer programs in storage 116 may be loaded into memory 104 and executed by a processor 102 in a manner known in the art.

The data processing system 100 may include fewer components than illustrated, additional components not illustrated herein, or some combination of the components illustrated and additional components. Data processing system 100 may include any computing device known in the art, such as a mainframe, server, personal computer, workstation, laptop, handheld computer, telephony device, network appliance, virtualization device, storage controller, etc.

Figure 2A:
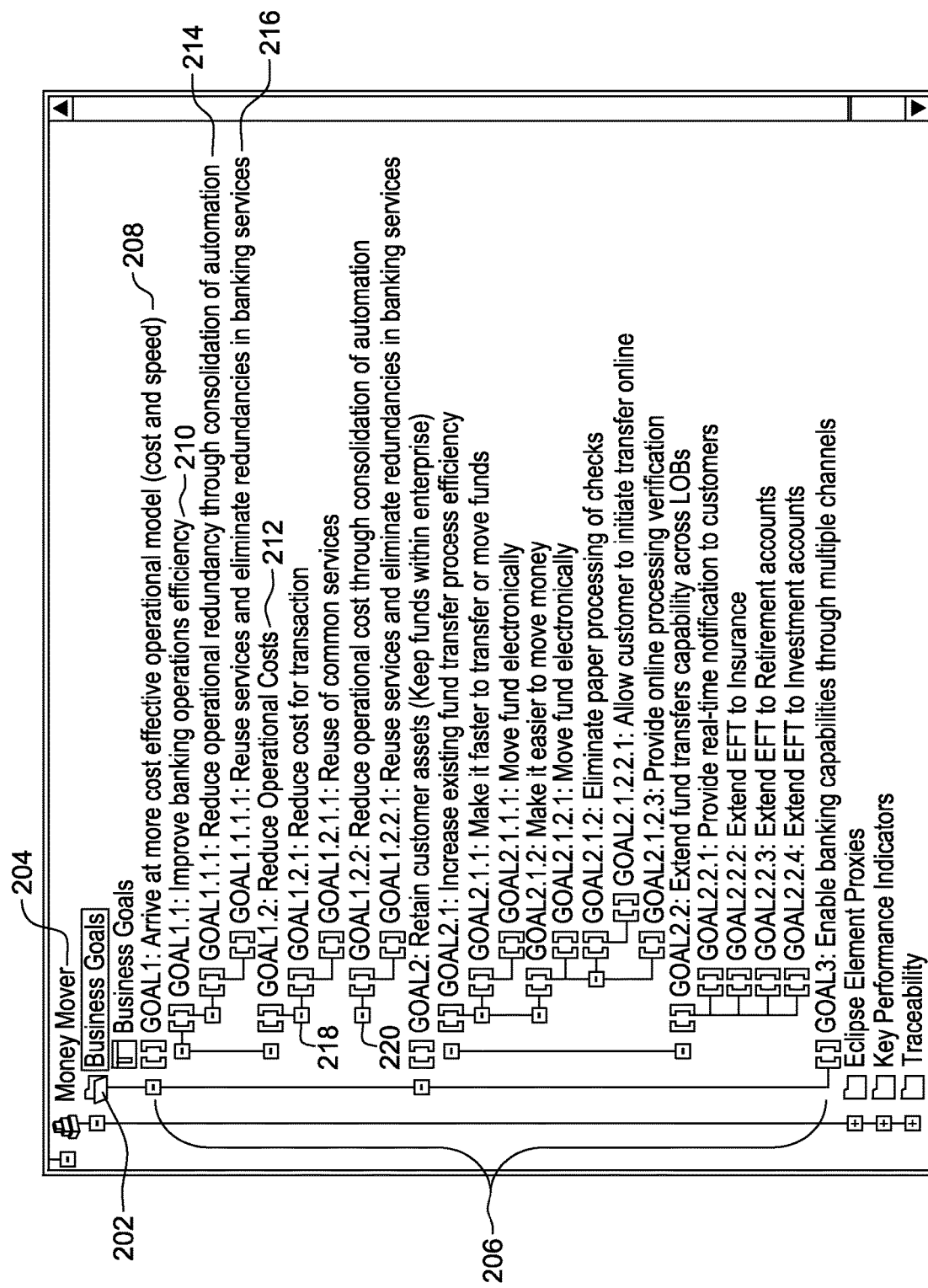
FIGS. 2A and 2B depict example representations of a requirement type and requirements management tool elements of a requirements management tool.
Figure 2B:
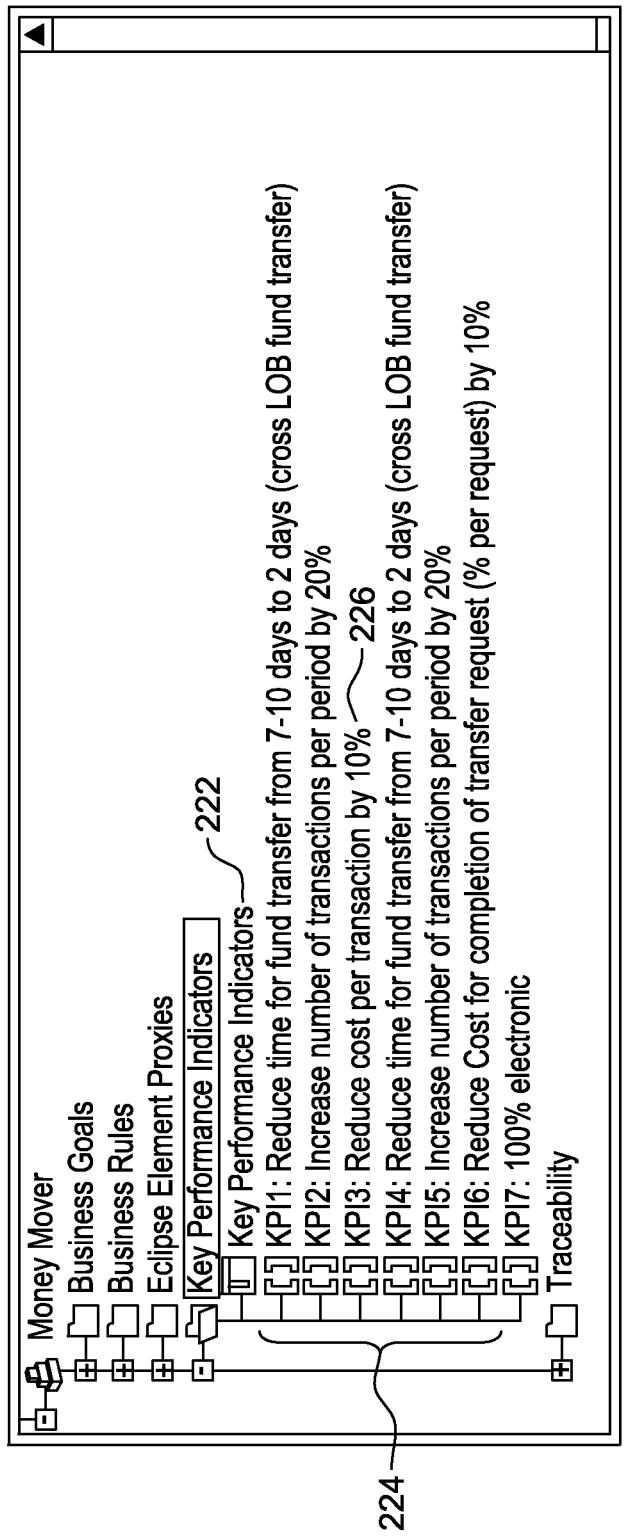

FIGS. 2A and 2B depict example representations of a requirement type and requirements management tool elements of a requirements management tool. A representation of a requirement type is a depiction in the requirements management tool of elements of that requirement type as well as the relationships (such as nested structure) between those elements. In this particular example, the requirements management tool is the Rational® Requisite Pro® product offered by International Business Machines Corporation. In FIG. 2A, a representation of the "Business Goals" requirement type 202 is depicted for a requirements management tool project entitled "Money Mover" 204. "Business Goals" is the requirement type of the elements represented in a hierarchy of nested elements 206 (also referred to herein as a "nested structure"). Nested structure 206 depicts the requirements management tool elements of the requirement type "Business Goals", including hierarchical relationships between those elements. Several parent elements are depicted having sub-elements (children, or child elements). For instance, element 208, entitled "GOAL1: Arrive at more cost effective operational model (cost and speed)", is a parent element of elements 210 and 212, and elements 210 and 212 are child elements of element 208, and are also themselves parent elements to other child elements. For instance, element 210 is a parent element to element 214 (which is itself a parent to element 216), and element 212 is a parent element to elements 218 and 220 (each of which have their own child elements).

Nested structure 206 captures important hierarchical relationship information between elements of the "Business Goals" requirement type. Business Goal child elements bear relations to their Business Goal parent elements that have real-world applicability. In FIG. 2A, element 212, corresponding to a goal of "GOAL 1.2:Reduce operational costs" has sub-elements (i.e. sub-goals) 218 ("GOAL 1.2.1: Reduce cost for transaction") and 220 ("GOAL 1.2.2: Reduce operational cost through consolidation of automation"), both of which are practical real-world goals for achieving the parent goal of reducing operational costs.

In FIG. 2B, a representation of the "Key Performance Indicators" (KPI) requirement type 222 is depicted for the same "Money Mover" project. In this example, seven KPI elements 224 of the KPI requirement type are depicted, one of which is element 226 corresponding to a KPI of "KPI3: Reduce cost per transaction by 10%". In the example of FIG. 2B, KPI elements 224 do not have nesting relationships.

FIGS. 2A and 2B depict "Business Goals" and "KPI" requirement types, but other requirement types will exist depending on the specific domain being modeled. In the business domain, other example requirement types include "Use Case", "Business Rule", and "Business Function", but could be of any other concept or construct desired.

Figure 3:
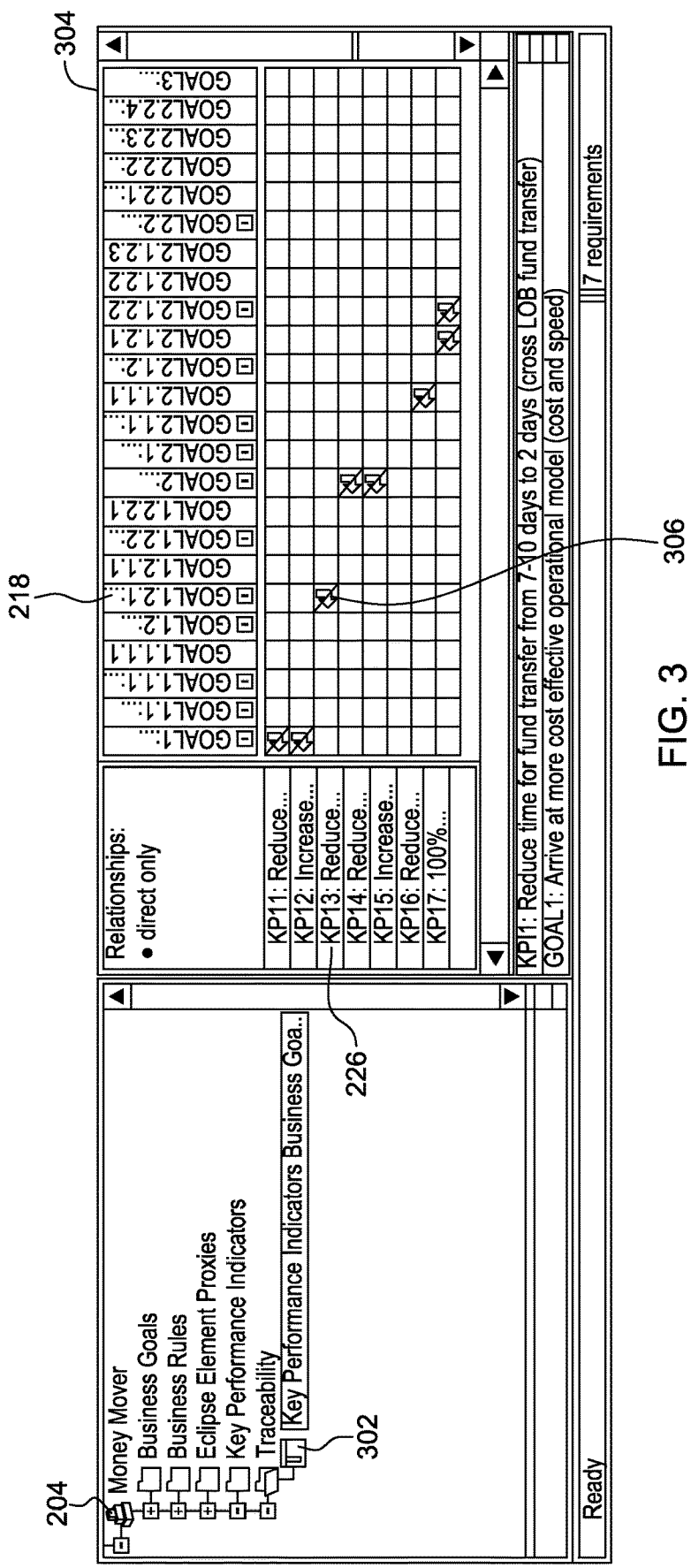
FIG. 3 depicts one example of a requirement type traceability map between requirement types in a requirements management tool.

Elements of different requirement types can be mapped to each other to follow a traceability relationship that exists between them. In the example requirement types of FIGS. 2A and 2B, a traceability mapping between a Key Performance Indicator and a Business Goal indicates the metric (KPI) by which the particular Business Goal can be assessed. This traceability mapping can be defined and depicted in a traceability map in the requirements management tool. FIG. 3 depicts one example of a requirement type traceability map between elements of requirement types of a requirements management tool (e.g. Rational® Requisite Pro offered by International Business Machines Corporation), and in particular, between the Business Goals and KPI requirement types. In one example, a user creates the traceability mappings of the traceability map.

In FIG. 3, "Money Mover" project 204 includes requirement type traceability map 302, the mappings for which between Business Goals elements and KPI elements are depicted in window 304. As is depicted therein, Business Goal 218 ("GOAL 1.2.1: Reduce cost for transaction") is mapped, as indicated by mapping 306, to KPI 226 "KPI3: Reduce cost per transaction by 10%". The significance of this mapping is that, for Business Goal 218, directed to reducing cost per transaction, the Key Performance Indicator for assessing achievement of that goal is whether cost per transaction is reduced by (at least) 10%. As can be seen in FIG. 3, additional mappings exist between other KPI elements and other Business Goals (a total of eight mappings are provided in requirement type traceability map 302).

Figure 4:
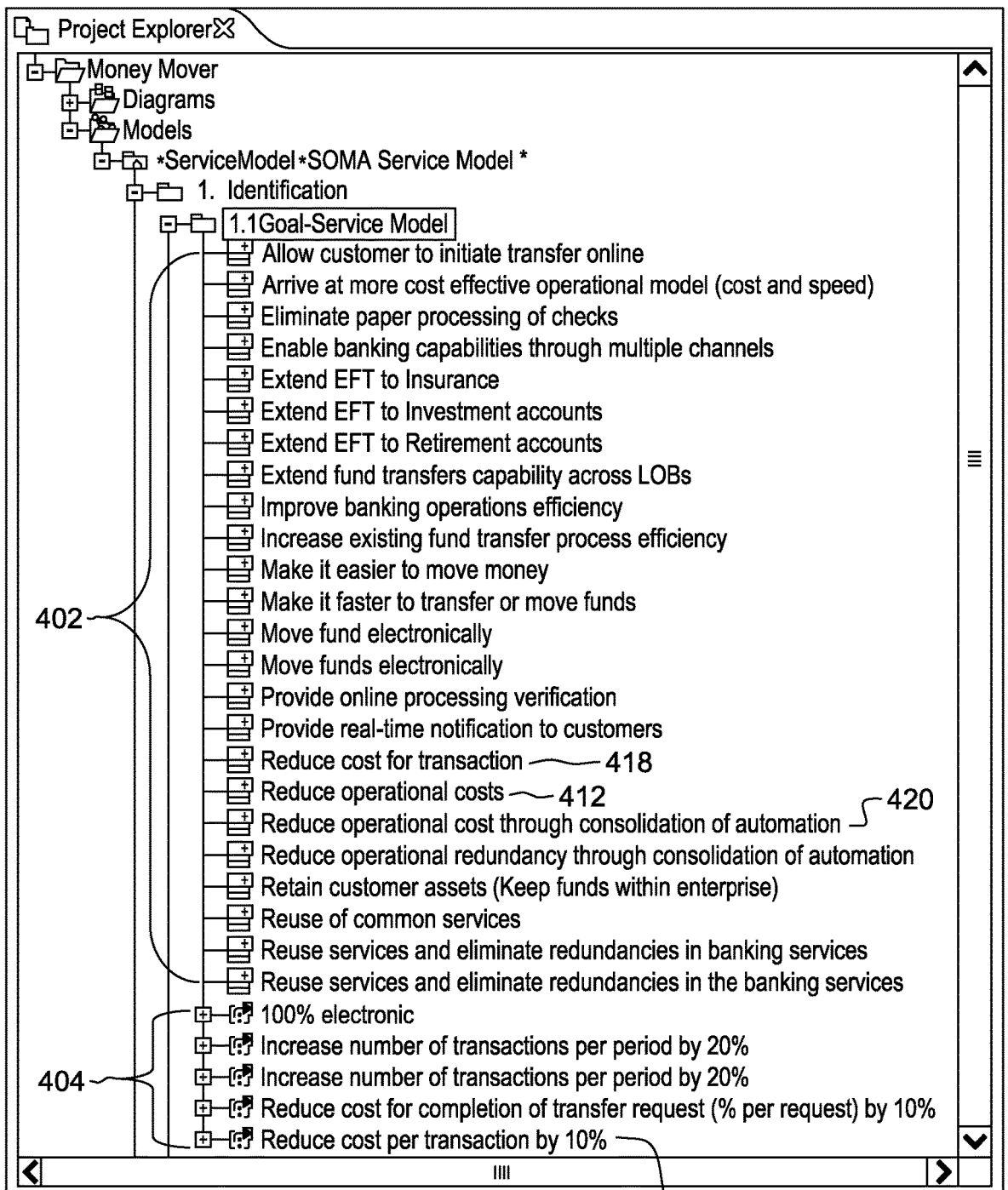
FIG. 4 illustrates an example of a UML model in which model elements have no applied stereotype, and nested structure and traceability between requirement types is lost.

When modeling elements from one tool, such as a requirements management tool, in a different modeling environment, such as a UML-based modeling environment, model element characteristics may be lost. FIG. 4 illustrates an example of a UML model in which model elements built from requirements management tool elements have no applied stereotype, and in which nested structure and traceability between requirement types is lost. In this example, the UML model is represented in a UML modeling tool, such as the Service-Oriented Modeling and Architecture Modeling Environment (SOMA-ME), an extension of the Rational® Software Architect and Rational® Software Modeler tools offered by International Business Machines Corporation. SOMA-ME accesses the requirements management tool project (i.e. "Money Mover" in this example) and instantiates UML elements that model the requirements management tool elements. However, several drawbacks are noted. First, the nested structure and traceability relationships described above are lost. As depicted in FIG. 4, elements 402 are instantiated to model the Business Goal elements (FIG. 2A) but parent/child hierarchical relationships are not preserved. For instance, elements 412, 418 and 420 are instantiated to model elements 212, 218, and 220 of FIG. 2A, however the hierarchical relationship between elements 218 and 220 (as children) and element 212 (as parent) is lost in that elements 412, 418, and 420 have no such relationship. These losses will lead to rework from the designer or the project architect who will need to re-create these relationships in the UML modeling tool.

Furthermore, UML elements 404 are instantiated to model the KPI elements (e.g. element 426 is instantiated to model element 226 of FIG. 2B) but the traceability mappings between the KPI elements and Business Goal elements (such as mapping 306 between KPI 226 and Business Goal 218) are not preserved. Instead, the KPIs are instantiated in alphabetical order, and in a flat structure that fails to capture the relationship between a KPI and a related Business Goal (such as the KPI being listed as a sub-element of the Business Goal indicating that the particular KPI is a metric for assessing the particular Business Goal).

Additionally, no stereotype is applied to the instantiated UML element. The Business Goals and KPI requirement types are extensions to the UML metamodel, made by way of stereotype definitions (i.e. one for each requirement type) in the UML profile. As describe above, stereotyping enables recognition that that a particular element is, for instance, a Business Goal type, rather than, for instance, a generic class, interface, package, or other standard model type of the UML metamodel.

In accordance with aspects of the present invention, stereotype, nested structure, and traceability information is obtained and utilized in building a UML-based model of elements of a requirements management tool. This facilitates not only carrying the relationships between requirements management tool elements forward to the UML modeling tool, but also instantiation of the UML elements with the proper stereotype that is needed to properly represent the requirement type of the element being instantiated.

Accordingly, stereotype assignments to the various requirement types of the requirements management tool are defined (e.g. by a user) and saved. During instantiation of the UML representations for the requirements management tool elements, the UML representations are instantiated with the proper stereotypes and a walkthrough of the nested structure and traceability mappings is performed. Using this information, the UML representation of the requirements management tool element is properly instantiated and associated (nesting, traceability) with the other instantiated UML representations for the requirements management tool project.

Figure 5:
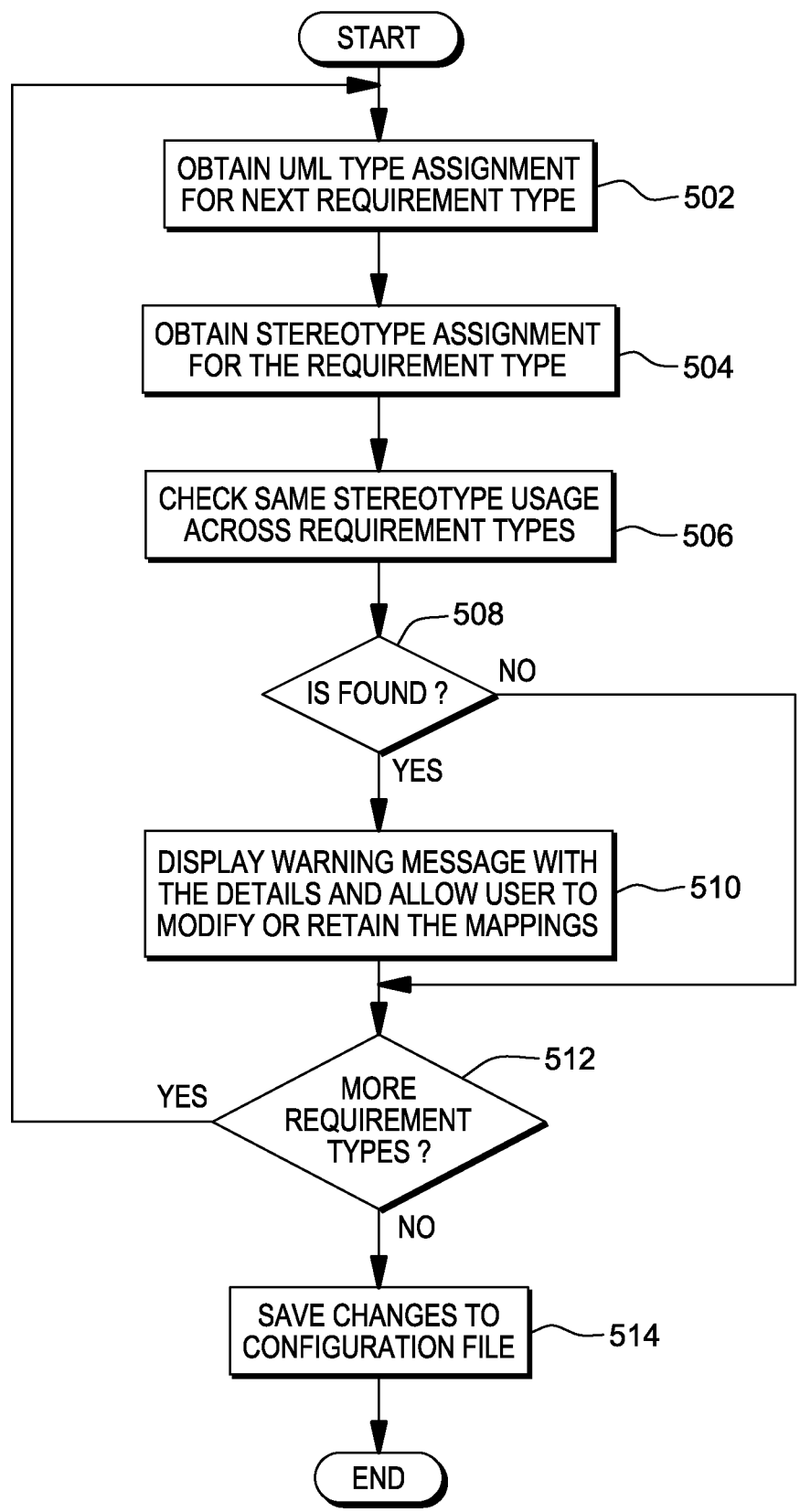
FIG. 5 depicts one example of a process for obtaining stereotype assignments for requirement types of a requirements management tool project, in accordance with an aspect of the present invention.

To facilitate aspects of the present invention, stereotype assignments for requirement types of a requirements management tool are obtained. FIG. 5 depicts one example of a process for obtaining stereotype assignments for requirement types of a requirements management tool project, in accordance with an aspect of the present invention. The process of FIG. 5 begins after the requirements management tool project has been opened, for instance opened by a user. The process proceeds by obtaining, for each requirement type, a UML type assignment and a stereotype assignment. Thus, a UML type assignment for a next requirement type of the project is obtained, 502. The UML type assignment is a mapping of the requirement type to its corresponding UML type (i.e. UML meta-class). For instance, a Business Goal requirement type might be mapped to the "class" UML type. In one example, this UML type assignment is provided by, and obtained from, a user utilizing a user-interface of the requirements management tool (see, for instance, FIG. 6). Next, a stereotype assignment is obtained for the requirement type, 504. The stereotype assignment extends the assigned UML type (i.e. UML meta-class, which was assigned at 502) to make it more specific. For instance, a "BusinessGoal" stereotype may exist in the "BusinessModeling" profile (UML profile) applied on the "class" UML type. The stereotype assignment applies the stereotype to the specific UML type it extends, for instance, in this example, the BusinessGoal stereotype extends the "class" UML Type. In one example, this assignment is provided by, and obtained from, the user utilizing a user-interface of the requirements management tool, as is depicted in FIG. 6.

Figures 6, 7:
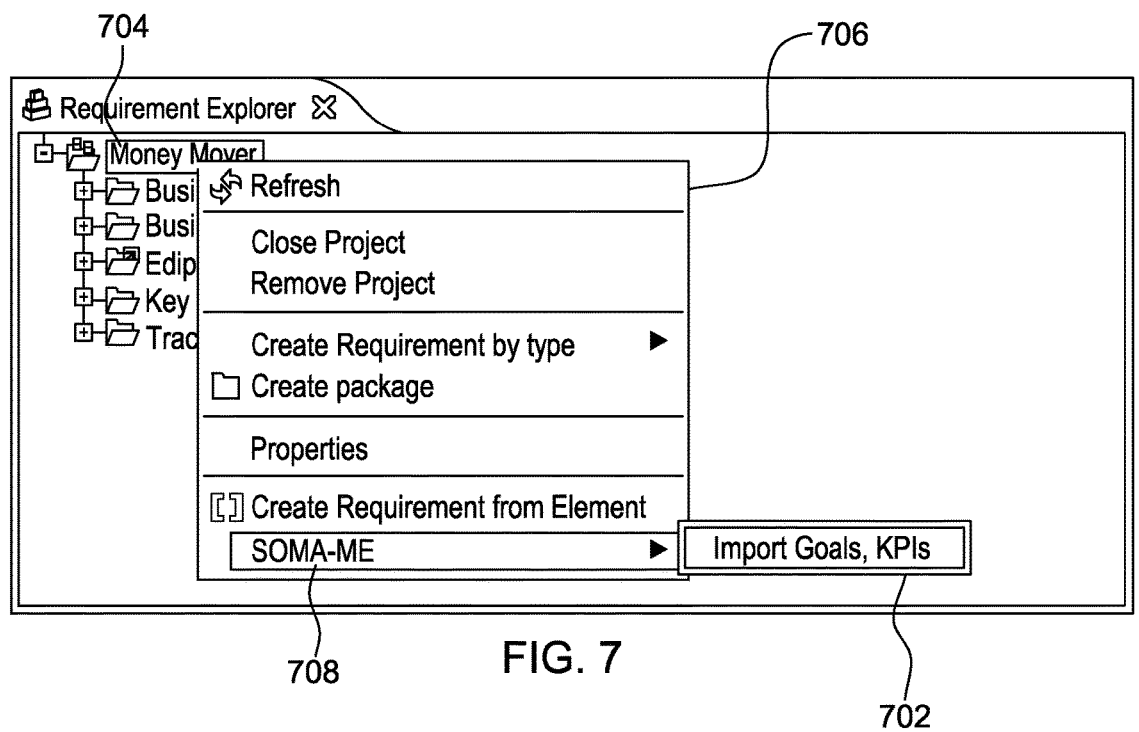
FIG. 6 depicts one example of a user interface for assigning stereotypes to requirement types in a requirements management tool, in accordance with an aspect of the present invention.
FIG. 7 depicts one example of an added context menu in a modeling tool to invoke a process for instantiating unified modeling language elements in accordance with an aspect of the present invention.

Referring to FIG. 6, a user can provide the stereotype assignments by way of an added user interface 600. User interface 600 can also be used to provide the UML type assignments as well. User interface 600 includes a requirement type portion 602, identifying one or more requirement types of the project, meta-class portion 604, for assigning the UML type (i.e. UML meta-class) for each particular requirement type, and stereotype assignment portion 606 for assigning a stereotype to a requirement type. In one example, the stereotype assignment is made using a standard representation of the stereotype. For instance, stereotype assignment 608 for requirement type 610 (Business Goal) indicates a stereotype of "BusinessModeling::BusinessGoal", which indicates that the stereotype "BusinessGoal" of the "BusinessModeling" UML profile is to be used for modeling elements of the Business Goal type. Similarly, the KPI requirement type can be mapped to the "KPI" stereotype of the "BusinessArchitecture" UML profile.

Returning to FIG. 5, after obtaining the stereotype assignment (i.e. from the user) for the requirement type, a check 506 is made for whether the same stereotype assignment was applied to a different requirement type. In general, it is not desirable for the same stereotype to be applied to more than one requirement type, however the user may wish such a situation. Thus, if the check indicates same stereotype usage is found, 508, the process continues by displaying a warning message, i.e. to the user, with the details, such as the attempted stereotype assignment and an indication that the same stereotype was applied to another requirement type, and allowing the user (for instance by presenting the user again with interface 600) to modify or retain the UML type and stereotype assignment made to the requirement type, 510. Thereafter, or if at 508 the same stereotype assignment between requirement types is not found, the process continues by determining whether there are more requirement types of the requirements management tool project for which a stereotype has yet to be assigned, 512. If so, the process returns to 502 for the next requirement type, otherwise, the assignments made to the requirement type(s) are saved to a configuration file, 514 to indicate the UML type and stereotype assigned to each requirement type.

The process of FIG. 5 can be repeated as the requirements management tool project is developed and modified. Such development might include addition of other requirement types. In repeating the process of FIG. 5, the additional stereotype assignments for the added requirement types can be saved to the configuration file. In one example, the process of FIG. 5 is performed upon exiting or saving the requirements management tool project, or responsive to a user's invocation of the process, for instance by way of an added user interface of the requirements management tool.

Further in accordance with aspects of the present invention, a UML-based modeling tool, such as the SOMA-ME extension to the Rational® Software Architect product offered by International Business Machines Corporation, can reference the saved configuration file as well as the nested structure and traceability information of the requirements management tool project when building the UML representations of the requirements management tool elements. In one example, this is provided through a process for instantiating unified modeling language elements. FIG. 7 depicts one example of an added context menu in the SOMA-ME to invoke a process for instantiating unified modeling language elements, in accordance with an aspect of the present invention.

As depicted in FIG. 7, an added context menu element 702 can be provided to a user for selection thereof to import into the SOMA-ME nested structure and traceability information as well as stereotype assignments. In this example, while in Requirements Explorer of the SOMA-ME, a user can right-click on the requirements management tool project name 704 and be presented with a context menu 706 having a submenu 708 which contains context menu element 702. The user can select element 702 to invoke a process for instantiating unified modeling language elements in accordance with aspects of the present invention.

Figure 8:
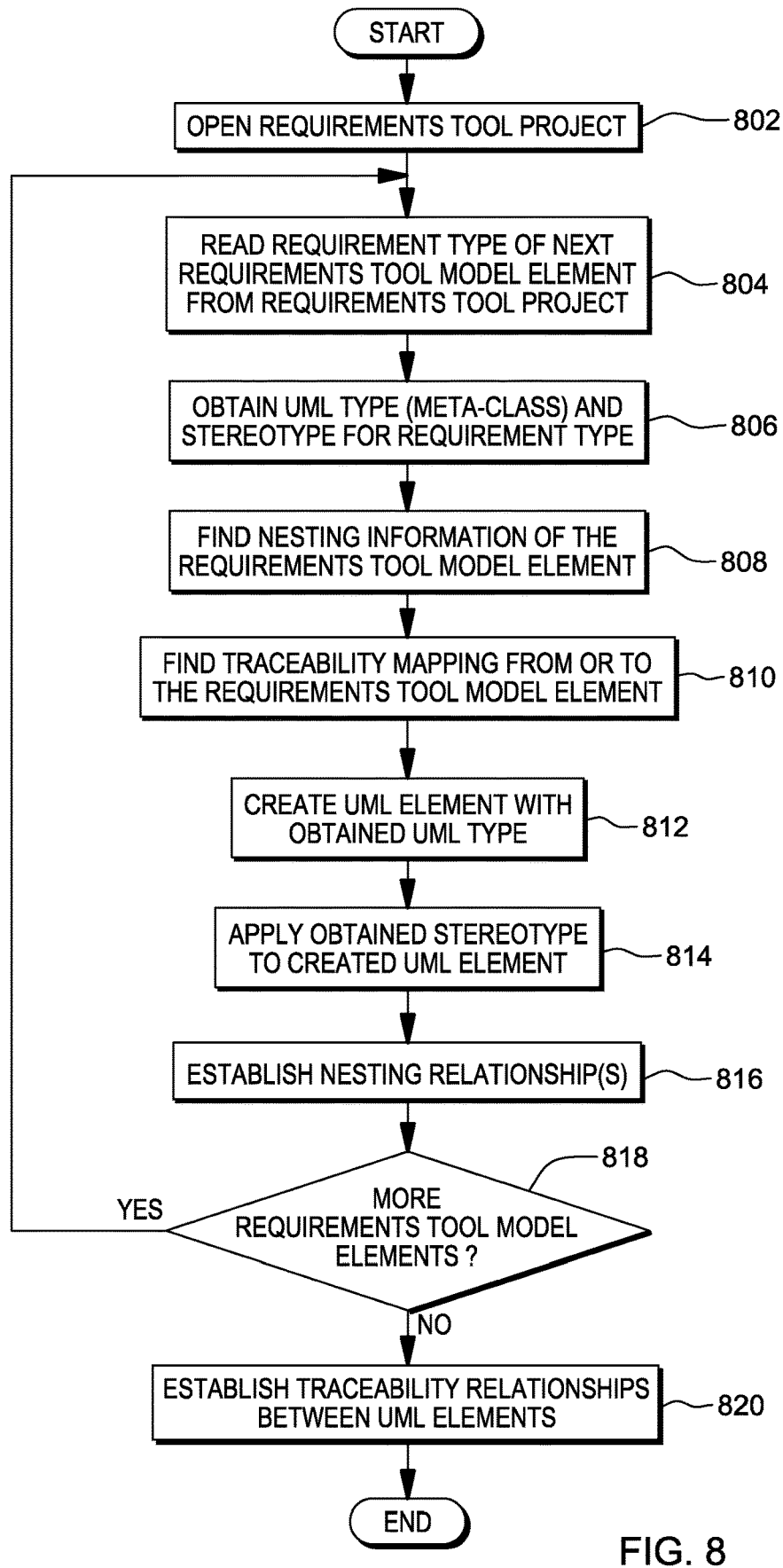
FIG. 8 depicts one example of a process of instantiating unified modeling language elements in accordance with one or more aspects of the present invention.

FIG. 8 depicts one example of a process of instantiating unified modeling language elements in accordance with one or more aspects of the present invention. This process is performed, in one example, by a data processing system on which the requirements management tool and/or UML modeling tool execute. In another example, the process is performed by a server or other dedicated data processing system in communication with the data processing system executing the requirements management tool and/or UML modeling tool. The process begins by opening the requirements management tool project, 802, if it not already opened. After the project is open and the requirements tool model elements thereof are accessible, the process iteratively instantiates the UML elements and the proper characteristics are automatically applied to the elements.

Thus, a next requirements tool model element of the project is selected and an indication of the requirement type of the requirements tool model element, which is one of its attributes/characteristics, is obtained, 804. Based on the obtained requirement type, the indications of the UML type and stereotype that have been associated with that requirement type are obtained, 806. This information is obtained from, for instance, the configuration file that was saved after receiving UML type and stereotype assignments from the user (see FIG. 5).

The process continues by finding nesting information of the requirements tool model element, 808, and finding traceability mapping(s) to/from the requirements tool model element, 810. In other words, hierarchical relationships (such as parent and child relationships) between the requirements tool element and other requirements tool element(s) are identified, and any traceability mappings from or to the requirements tool element are identified. For instance, using the examples of FIGS. 2A and 3, when element 212 is selected, nested elements 218 and 220 are identified, as is traceability mapping 306, which maps Business Goal element 212 to KPI element 226. A UML element is then created having the obtained (e.g. from the configuration file) UML type, for modeling the requirements tool element, 812. Additionally, the obtained (e.g. from the configuration file) stereotype is automatically applied to the UML element, 814.

Next, nesting relationships(s) are established, 816, between the created UML element and other created UML elements. For instance, based on the obtained nesting information of the requirements tool model element, it can be determined whether the requirements tool element being modeled is a child element of a parent requirements tool element, and, if so, the UML element being instantiated can be established as a child element of parent UML element instantiated for modeling the parent requirements tool element. Similarly, based on determining that the requirements tool element being modeled is a parent element of a child requirements tool element, the UML element being instantiated can be established as a parent element of a child UML element instantiated for modeling the child requirements tool element. If a parent or child UML element of the instantiated UML element has yet to be instantiated, then the nesting relationship can be established upon instantiating that parent or child UML element.

The process continues by determining whether further requirements tool elements exist for which a corresponding UML element is to be instantiated, 818. If so, the process returns to 804 to instantiate a UML element for the next requirements tool model element. Otherwise, the process proceeds to 820 where the identified traceability mappings are established between the UML elements. Traceability mappings from/to the requirements tool elements being modeled are carried into the UML model and established from/to the corresponding UML elements. For instance, based on an identified traceability mapping between two requirements tool model elements, a traceability relationship can be established between the two UML elements instantiated for modeling the two requirements tool model elements.

After establishing the traceability mappings, 820, the process ends. Upon the completion of the process of FIG. 8, a hierarchy of nested UML elements is established based on the hierarchy from the requirements management tool project, traceability mappings are carried forward, and the UML elements have the appropriate stereotypes applied thereto. Therefore, requirements management tool element characteristics (stereotype, nesting information, traceability) are preserved in the UML-based model.

Figure 9:
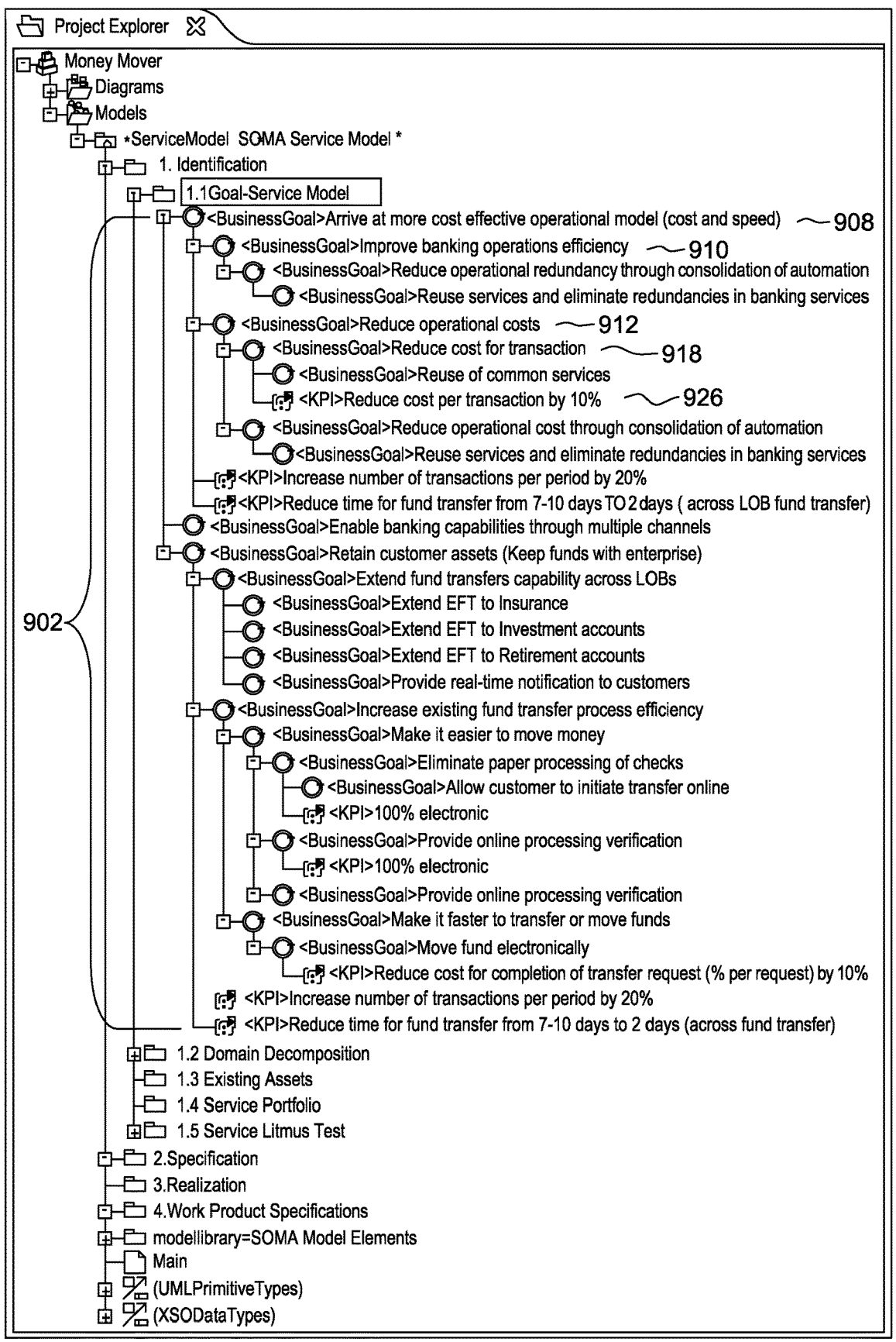
FIG. 9 depicts an example of a UML model in which model elements have stereotypes applied thereto and in which and nested structure and traceability between requirement types is preserved, in accordance with one or more aspects of the present invention.

FIG. 9 depicts an example of a UML model in which model elements have applied thereto a stereotype, and nested structure and traceability between requirement types is preserved, in accordance with one or more aspects of the present invention. In the UML model of FIG. 9, the hierarchy of nested business goal requirements management tool elements (as depicted in FIG. 2A) is exactly preserved in hierarchy of nested business goal UML elements 902. As an example, UML element 908, a Business Goal corresponding to Business Goal 208 from FIG. 2A, is a parent element of UML elements 910 and 912, corresponding to child Business Goals 210 and 212 of Business Goal 208). In addition to these hierarchical relationships being retained, traceability mappings are as well. This is indicated by the presence of KPI UML elements under the Business Goal UML elements to which they are mapped. For instance traceability mapping 306 (FIG. 3) between Business Goal element 218 and KPI element 226 is indicated by KPI UML element 926, "<KPI> Reduce cost per transaction by 10%" being nested within Business Goal UML element 918, "<BusinessGoal> Reduce cost per transaction". Additionally, the stereotypes are applied to each of the UML elements, as indicated by the rendering of the stereotype as a stereotype name surrounded by guillemets before each UML element (a standardized way of representing a stereotype of a UML element in UML modeling tools).

As described above, in accordance with aspects of the present invention, characteristics of requirements management tool elements, including stereotype assignment and nesting and traceability relationships between elements of the requirements management tool project, are leveraged when building a UML model of the requirements management tool project. Requirements management tool elements become associated with a stereotype when a user assigns a stereotype to a requirements type of the requirements management project. The requirements management tool element is of a particular requirement type, and it becomes associated with the stereotype assigned that particular requirement type. When instantiating UML representations of the requirements management tool elements, stereotype, traceability, and nesting information is applied and carried into the UML model.

Aspects of the present invention advantageously offer significant reduction in efforts needed to apply the necessary UML characteristics to instantiated UML elements. For instance, it relieves a user from having to recreate the same elements in the UML-based modeling tool. As a specific example, it relieves a user from having to recreate each element of a Rational® Requisite Pro project over again in Rational® Software Architect to have the appropriate UML characteristics (i.e. stereotype, traceability, and nesting information). Furthermore, and consequently, increased productivity, maintenance of traceability, and proper nesting structure is realized due to the automation provided in instantiating the UML elements in accordance with aspects of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 10:
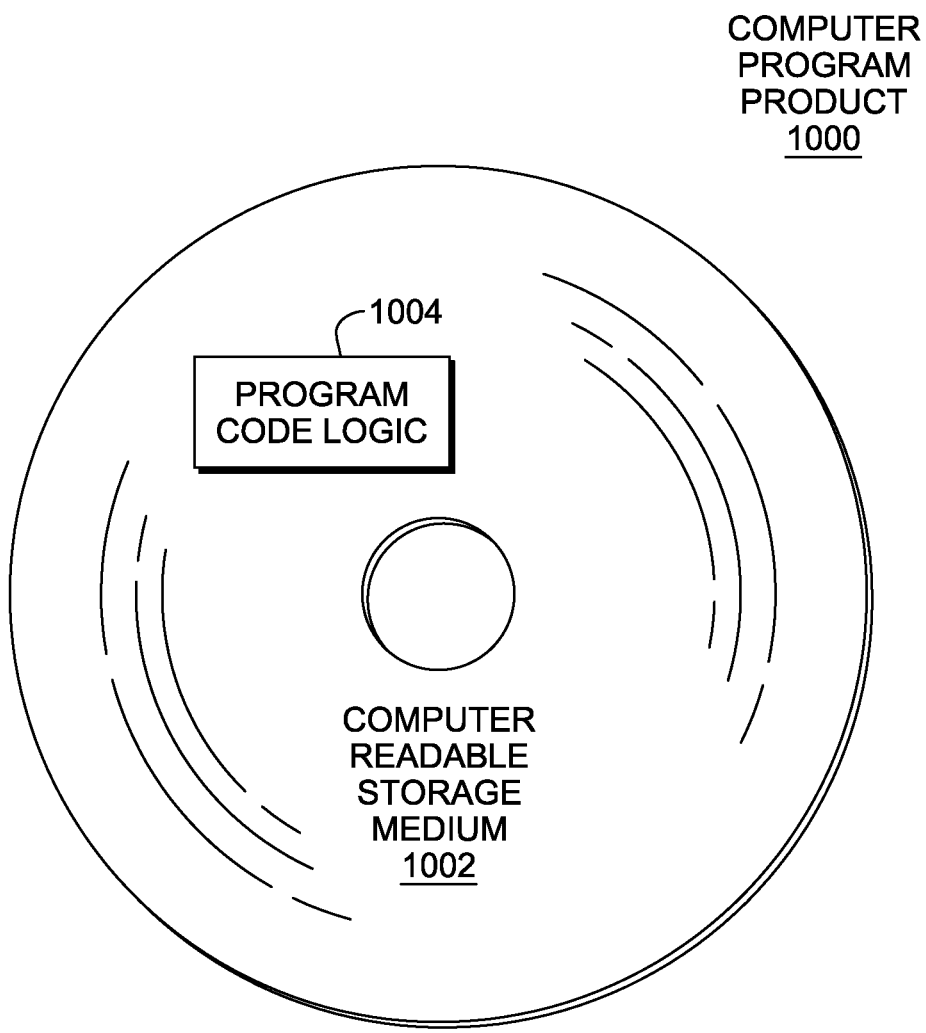
FIG. 10 depicts one embodiment of a computer program product incorporating one or more aspects of the present invention.

Referring now to FIG. 10, in one example, a computer program product 1000 includes, for instance, one or more computer readable media 1002 to store computer readable program code means or logic 1004 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method comprising:
    obtaining, by a processor, an indication of a requirement type of a requirements management tool element modeled in a requirements management tool, the requirements management tool element being of a requirements management tool project of the requirements management tool;
    performing a lookup, using the indicated requirement type of the requirements management tool element, in a prespecified, one-to-one mapping of the indicated requirement type to a stereotype that is prior-associated with the indicated requirement type, and ascertaining the stereotype, the stereotype defining an extension to a metamodel of a unified modeling language, and the stereotype being one stereotype of a plurality of stereotypes available for association with requirement types of the requirements management tool; and
    using the stereotype prior-associated with the indicated requirement type, building, in a unified modeling language modeling tool, a unified modeling language model of the requirements management tool project, the unified modeling language modeling tool being a different modeling environment than the requirements management tool, the building comprising:
        instantiating an element of the unified modeling language in the unified modeling language modeling tool for modeling the requirements management tool element, wherein the instantiating comprises automatically applying the stereotype associated with the indicated requirement type to the unified modeling language element based on the ascertained stereotype associated with the indicated requirement type of the requirements management tool element.

2. The method of claim 1, further comprising obtaining an indication of a unified modeling language type of the indicated requirement type of the requirements management tool element, wherein the instantiating instantiates the unified modeling language element with the indicated unified modeling language type.

3. The method of claim 1, wherein the requirements management tool element is one element in a hierarchy of nested requirements management tool elements, and wherein the instantiating preserves, in the unified modeling language modeling tool, a hierarchical relationship between the requirements management tool element and at least one other requirements management tool element in the hierarchy of nested requirements management tool elements.

4. The method of claim 3, wherein the requirements management tool element is one selected from the group consisting of:
    a parent element comprising at least one child element in the hierarchy of nested requirements management tool elements, and wherein preserving the hierarchical relationship comprises, based on determining that the requirements management tool element is a parent element, establishing, in the unified modeling language modeling tool, the instantiated unified modeling language element as a parent element of at least one child unified modeling language elements instantiated for modeling the at least one child requirements management tool element; and
    a child element of a parent element in the hierarchy of nested requirements management tool elements, and wherein preserving the hierarchical relationship comprises, based on determining that the requirements management tool element is a child element of the parent requirements management tool element, establishing, in the unified modeling language modeling tool, the instantiated unified modeling language element as a child element of a parent unified modeling language element instantiated for modeling the parent requirements management tool element.

5. The method of claim 1, wherein the instantiating further comprises determining a traceability mapping between the requirements management tool element and at least one other requirements management tool element, wherein the indicated requirement type of the requirements management tool element is different from at least one other requirement type of the at least one other requirements management tool element.

6. The method of claim 5, wherein the instantiating further comprises establishing, based on the determined traceability mapping, at least one traceability relationship between the unified modeling language element and at least one other unified modeling language element instantiated in the unified modeling language modeling tool for modeling the at least one other requirements management tool element.

7. The method of claim 1, wherein the method further comprises repeating the obtaining an indication of a requirement type, the performing a lookup of a stereotype that is prior-associated with the indicated requirement type and ascertaining the stereotype, and the building, for one or more other requirements management tool elements of the requirements management tool project, to instantiate one or more other unified modeling language elements.

8. The method of claim 7, wherein the method further comprises establishing a hierarchy of nested unified modeling language elements, the hierarchy of nested unified modeling language elements comprising the unified modeling language element and the one or more other unified modeling language elements, wherein the hierarchy of nested unified modeling language elements is based, at least in part, on a hierarchy of nested requirements management tool elements of the requirements management tool project.

9. The method of claim 1, wherein obtaining the stereotype associated with the indicated requirement type comprises:
    obtaining from a user a stereotype assignment for the indicated requirement type, the stereotype assignment specifying the stereotype for association with the indicated requirement type;
    saving the stereotype assignment from the user in a configuration file; and checking the saved configuration file to obtain therefrom the stereotype associated with the indicated requirement type.

10. The method of claim 9, further comprising, prior to the saving, checking whether the specified stereotype is already assigned to a different requirement type, and, based on the checking indicating that the specified stereotype is already assigned to a different requirement type, prompting the user to confirm the stereotype assignment.

11. The method of claim 1, wherein the ascertained stereotype associated with the indicated requirement type specifies a UML profile together with a stereotype of that UML profile.

12. A system comprising:
a memory; and
a processor in communication with the memory, wherein the system is configured to perform a method comprising:
obtaining an indication of a requirement type of a requirements management tool element modeled in a requirements management tool, the requirements management tool element being of a requirements management tool project of the requirements management tool;
performing a lookup, using the indicated requirement type of the requirements management tool element in a prespecified, one-to-one mapping of the indicated requirement type to a stereotype that is prior-associated with the indicated requirement type, and ascertaining the stereotype, the stereotype defining an extension to a metamodel of a unified modeling language, and the stereotype being one stereotype of a plurality of stereotypes available for association with requirement types of the requirements management tool; and
using the stereotype prior-associated with the indicated requirement type, building, in a unified modeling language modeling tool, a unified modeling language model of the requirements management tool project, the unified modeling language modeling tool being a different modeling environment than the requirements management tool, the building comprising:
instantiating an element of the unified modeling language in the unified modeling language modeling tool for modeling the requirements management tool element, wherein the instantiating comprises automatically applying the stereotype associated with the indicated requirement type to the unified modeling language element based on the ascertained stereotype associated with the indicated requirement type of the requirements management tool element.

13. The system of claim 12, wherein the requirements management tool element is one element in a hierarchy of nested requirements management tool elements, and wherein the instantiating preserves, in the unified modeling language modeling tool, a hierarchical relationship between the requirements management tool element and at least one other requirements management tool element in the hierarchy of nested requirements management tool elements.

14. The system of claim 12, wherein the instantiating further comprises determining a traceability mapping between the requirements management tool element and at least one other requirements management tool element, wherein the indicated requirement type of the requirements management tool element is different from at least one other requirement type of the at least one other requirements management tool element.

15. The system of claim 14, wherein the instantiating further comprises establishing, based on the determined traceability mapping, at least one traceability relationship between the unified modeling language element and at least one other unified modeling language element instantiated in the unified modeling language modeling tool for modeling the at least one other requirements management tool element.

16. The system of claim 12, wherein obtaining the stereotype associated with the indicated requirement type comprises:
obtaining from a user a stereotype assignment for the indicated requirement type, the stereotype assignment specifying the stereotype for association with the indicated requirement type;
saving the stereotype assignment from the user in a configuration file; and
checking the saved configuration file to obtain therefrom the stereotype associated with the indicated requirement type.

17. A computer program product comprising:
a non-transitory computer readable storage medium readable by a processor and storing instructions for execution by the processor to perform a method comprising:
obtaining, by a processor, an indication of a requirement type of a requirements management tool element modeled in a requirements management tool, the requirements management tool element being of a requirements management tool project of the requirements management tool;
performing a lookup, using the indicated requirement type of the requirements management tool element, in a prespecified, one-to-one mapping of the indicated requirement type to a stereotype that is prior-associated with the indicated requirement type and ascertaining the stereotype, the stereotype defining an extension to a metamodel of a unified modeling language, and the stereotype being one stereotype of a plurality of stereotypes available for association with requirement types of the requirements management tool; and
using the stereotype prior-associated with the indicated requirement type, building, in a unified modeling language modeling tool, a unified modeling language model of the requirements management tool project, the unified modeling language modeling tool being a different modeling environment than the requirements management tool, the building comprising:
instantiating an element of the unified modeling language in the unified modeling language modeling tool for modeling the requirements management tool element, wherein the instantiating comprises automatically applying the stereotype associated with the indicated requirement type to the unified modeling language element based on the ascertained stereotype associated with the indicated requirement type of the requirements management tool element.

18. The computer program product of claim 17, wherein the requirements management tool element is one element in a hierarchy of nested requirements management tool elements, and wherein the instantiating preserves, in the unified modeling language modeling tool, a hierarchical relationship between the requirements management tool element and at least one other requirements management tool element in the hierarchy of nested requirements management tool elements.

19. The computer program product of claim 17, wherein the instantiating further comprises:
- determining a traceability mapping between the requirements management tool element and at least one other requirements management tool element, wherein the indicated requirement type of the requirements management tool element is different from at least one other requirement type of the at least one other requirements management tool element; and
- establishing, based on the determined traceability mapping, at least one traceability relationship between the unified modeling language element and at least one other unified modeling language element instantiated in the unified modeling language modeling tool for modeling the at least one other requirements management tool element.

20. The computer program product of claim 17, wherein obtaining the stereotype associated with the indicated requirement type comprises:
- obtaining from a user a stereotype assignment for the indicated requirement type, the stereotype assignment specifying the stereotype for association with the indicated requirement type;
- saving the stereotype assignment from the user in a configuration file; and
- checking the saved configuration file to obtain therefrom the stereotype associated with the indicated requirement type.

* * * * *